(12) United States Patent
Ikriannikov et al.

(10) Patent No.: US 8,330,567 B2
(45) Date of Patent: Dec. 11, 2012

(54) ASYMMETRICAL COUPLED INDUCTORS AND ASSOCIATED METHODS

(75) Inventors: Alexandr Ikriannikov, Castro Valley, CA (US); Ognjen Djekic, Fremont, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 184 days.

(21) Appl. No.: 12/687,793

(22) Filed: Jan. 14, 2010

(65) Prior Publication Data

US 2011/0169476 A1    Jul. 14, 2011

(51) Int. Cl.
    H01F 17/06    (2006.01)
(52) U.S. Cl. ........................................ 336/178
(58) Field of Classification Search ............ 336/65, 336/83, 165, 178, 200, 212, 232
    See application file for complete search history.

(56) References Cited

U.S. PATENT DOCUMENTS

| | | |
|---|---|---|
| 2,212,543 A | 8/1940 | Jovy |
| 3,878,495 A | 4/1975 | Thomas |
| 4,488,136 A | 12/1984 | Hansen et al. |
| 4,531,085 A | 7/1985 | Mesenhimer |
| 5,003,277 A | 3/1991 | Sokai et al. |
| 5,161,098 A | 11/1992 | Balakrishnan |
| 5,177,460 A | 1/1993 | Dhyanchand et al. |
| 5,182,535 A | 1/1993 | Dhyanchand |
| 5,469,334 A | 11/1995 | Balakrishnan |
| 5,568,111 A | 10/1996 | Metsler |
| 5,939,966 A | 8/1999 | Shin' Ei |
| 6,060,977 A | 5/2000 | Yamamoto et al. |
| 6,114,932 A | 9/2000 | Wester et al. |
| 6,147,584 A | 11/2000 | Shin'el |
| 6,348,848 B1 | 2/2002 | Herbert |
| 6,356,179 B1 | 3/2002 | Yamada |
| 6,362,986 B1 | 3/2002 | Schultz et al. |
| 6,377,155 B1 | 4/2002 | Allen et al. |
| 6,388,896 B1 * | 5/2002 | Cuk ................................ 363/16 |
| 6,477,414 B1 | 11/2002 | Silvian |
| 6,545,450 B1 | 4/2003 | Ledenev et al. |

(Continued)

FOREIGN PATENT DOCUMENTS

EP    0 012 629    6/1980

(Continued)

OTHER PUBLICATIONS

PCT/US11/20842 Invitation to Pay Additional Fees mailed May 2, 2011, 5 pages.

(Continued)

*Primary Examiner* — Tuyen Nguyen
(74) *Attorney, Agent, or Firm* — Lathrop & Gage LLP

(57) ABSTRACT

An asymmetrical coupled inductor includes a first and a second winding and a core. The core is formed of a magnetic material and magnetically couples together the windings. The core is configured such that a leakage inductance value of the first winding is greater than a leakage inductance value of the second winding. The coupled inductor is included, for example, in a multi-phase DC-to-DC converter. A DC-to-DC converter including a symmetrical coupled inductor includes at least one additional inductor electrically coupled in series with one or more of the coupled inductor's windings. A controller for a DC-to-DC converter including a first phase having an effective inductance value greater than an effective inductance value of a second phase is configured to shut down the second phase while the first phase remains operational during a light load operating condition.

30 Claims, 12 Drawing Sheets

U.S. PATENT DOCUMENTS

| | | |
|---|---|---|
| 6,686,727 B2 | 2/2004 | Ledenev et al. |
| 6,696,823 B2 | 2/2004 | Ledenev et al. |
| 6,714,428 B2 | 3/2004 | Huang et al. |
| 6,737,951 B1 | 5/2004 | Decristofaro et al. |
| 6,757,184 B2 | 6/2004 | Wei et al. |
| 6,784,644 B2 | 8/2004 | Xu et al. |
| 6,980,077 B1 * | 12/2005 | Chandrasekaran et al. .. 336/212 |
| 7,199,695 B1 | 4/2007 | Zhou et al. |
| 7,239,530 B1 | 7/2007 | Djekic et al. |
| 7,315,463 B2 | 1/2008 | Schrom et al. |
| 7,317,305 B1 | 1/2008 | Stratakos et al. |
| 7,352,269 B2 | 4/2008 | Li et al. |
| 7,492,246 B2 | 2/2009 | Chang |
| 7,498,920 B2 | 3/2009 | Sullivan et al. |
| 7,504,808 B2 | 3/2009 | Schrom et al. |
| 7,548,046 B1 | 6/2009 | Stratakos et al. |
| 2001/0043135 A1 | 11/2001 | Yamada et al. |
| 2002/0093413 A1 | 7/2002 | Shin'ei |
| 2004/0085173 A1 | 5/2004 | Decristofaro et al. |
| 2005/0024179 A1 | 2/2005 | Chandrasekaran et al. |
| 2006/0012348 A1 | 1/2006 | Zhao et al. |
| 2006/0158297 A1 | 7/2006 | Sutardja |
| 2006/0197510 A1 | 9/2006 | Chandrasekaran |
| 2007/0076453 A1 | 4/2007 | Schultz et al. |
| 2007/0097571 A1 | 5/2007 | Dinh et al. |
| 2007/0175701 A1 | 8/2007 | Xu et al. |
| 2007/0176726 A1 | 8/2007 | Xu et al. |
| 2008/0150666 A1 | 6/2008 | Chandrasekaran et al. |
| 2008/0205098 A1 | 8/2008 | Xu et al. |
| 2009/0001945 A1 | 1/2009 | Wickersham et al. |
| 2009/0146622 A1 | 6/2009 | McDonald et al. |
| 2009/0179723 A1 | 7/2009 | Ikriannikov et al. |
| 2009/0231081 A1 | 9/2009 | Ikriannikov et al. |
| 2009/0237197 A1 | 9/2009 | Ikriannikov et al. |

FOREIGN PATENT DOCUMENTS

| | | |
|---|---|---|
| EP | 0 142 207 | 5/1985 |
| EP | 0 755 060 | 1/1997 |
| EP | 1 519 392 | 3/2005 |
| EP | 1 835 604 | 9/2007 |
| JP | 60-015908 | 1/1985 |
| JP | 11 307369 | 11/1999 |
| WO | WO/02/17469 | 2/2002 |

OTHER PUBLICATIONS

Dong et al., Twisted Core Coupled Inductors for Microprocessor Voltage Regulators, Power Electronics Specialists Conference, pp. 2386-2392, Jun. 17-21, 2007.

Dong et al., The Short Winding Path Coupled Inductor Voltage Regulators, Applied Power Electronics Conference and Exposition, pp. 1446-1452, Feb. 24-28, 2008.

Dong et al., Evaluation of Coupled Inductor Voltage Regulators, Applied Power Electronics Conference and Exposition, pp. 831-837, Feb. 24-28, 2008.

Pulse, SMT Power Inductors datasheet, 2 pages, Nov. 2007.

Wong, Pit-Leong, et al., "Investigating Coupling Inductors in the Interleaving QSW VRM" Applied Power Electronics Conference and Exposition, 2000. APEC 2000. Fifteenth Annual IEEE; Mar. 2000; pp. 973-978.

Wong, Pit-Leong, et al.; A Novel Modeling Concept for Multi-coupling Core Structures; Center for Power Electronics Systems; IEEE, 7 pages.

Wong, Pit-Leong, et al.; Performance Improvements of Interleaving VRMs With Coupling Inductors, IEEE Transactions on Power Electronics; vol. 16, No. 4; pp. 499-507; Jul. 2001.

Chandrasekaran et al., "Integrated magnetic for interleaved DC-DC boost converter for fuel cell powered vehicles" 2004 35th Annual IEEE Power Electronics Specialists Conference pp. 356-361.

PCT/US11/20842 International Search Report and Written Opinion mailed Dec. 20, 2011, 24 pages.

\* cited by examiner

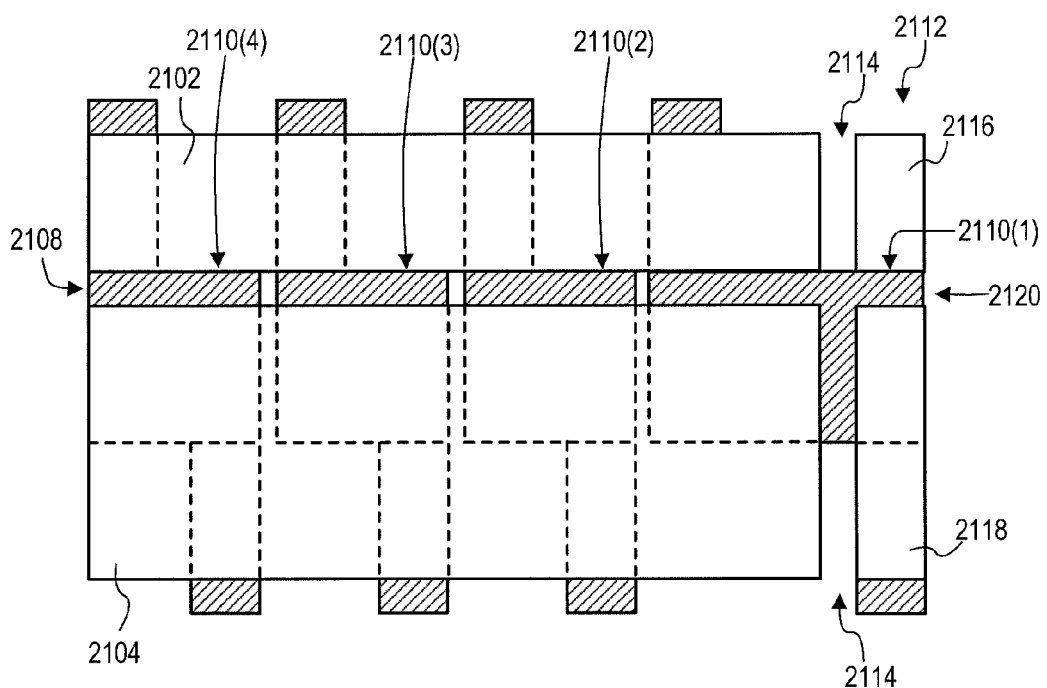
FIG. 23
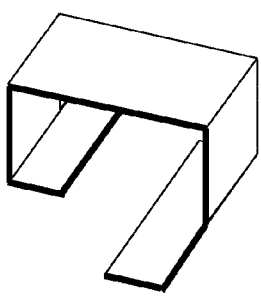
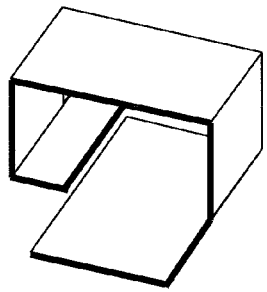
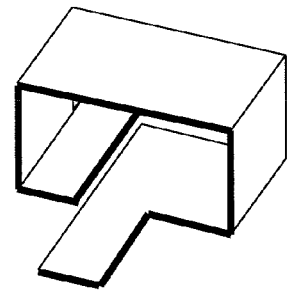
FIG. 24  FIG. 25  FIG. 26

ASYMMETRICAL COUPLED INDUCTORS AND ASSOCIATED METHODS

BACKGROUND

Switching DC-to-DC converters having a multiphase coupled inductor topology are described in U.S. Pat. No. 6,362,986 to Schultz et al., the disclosure of which is incorporated herein by reference. These converters have advantages, including reduced ripple current in the inductors and the switches, which enables reduced per-phase inductance or reduced switching frequency over converters having conventional multi-phase DC-to-DC converter topologies. As a result, DC-to-DC converters with magnetically coupled output inductors achieve a superior transient response without an efficiency penalty compared with conventional multiphase topologies. This allows a significant reduction in output capacitance resulting in smaller, lower cost solutions.

DC-to-DC converters are often used in applications where the load may vary considerably as a system operates. For example, the processor of a modern notebook computer may demand tens to more than one hundred amps of current when performing processor-intensive computation at maximum clock rate, while the processor needs much less current, possibly only a few milliamps, when the system is idle. When a DC-to-DC converter is designed to power such a processor, the inductors, capacitors, and switching transistors of the converter are typically designed to handle the maximum sustained current required by the processor without overheating. There are many other applications for power converters where converter load current levels may vary over time. Variation between maximum and minimum load current of factors of hundreds to thousands are not unusual.

DC-to-DC converters typically operate in Continuous Conduction Mode (CCM), where switching and AC current related losses do not scale down with decreasing load current. Therefore, switching and AC current related losses may become a significant part of the total power absorbed by the converter when the load current is small. Since many systems spend considerable portions of their operating lifetime operating at low power levels, they may waste considerable energy over their lifetimes. It is especially important in battery powered systems that DC-to-DC converters operate at high efficiency over the entire range of possible output power demand to optimize battery life.

Accordingly, it may be desirable to operate DC-to-DC converters in Discontinuous Conduction Mode (DCM) under light load conditions to reduce switching and AC current related losses. Additionally, one or more phases of a multiphase DC-to-DC converter may be shut down during light load conditions to reduce switching and AC current related losses. Examples of DC-to-DC converters including coupled inductors that may operate in DCM and/or shut down phases during light load conditions may be found in U.S. Pat. Nos. 7,317,305 and 7,548,046 to Stratakos et al., each of which is incorporated herein by reference.

SUMMARY

In an embodiment, an asymmetrical coupled inductor includes a first and a second winding, a core, and a leakage section. The core is formed of a magnetic material and magnetically couples the windings. The leakage section is formed of a magnetic material and is at least partially magnetically isolated from the core. The leakage section is magnetically coupled to the first winding such that a leakage inductance value of the first winding is greater than a leakage inductance value of the second winding.

In an embodiment, an asymmetrical coupled inductor includes a first winding, a second winding, and a core. The first and second windings have a same number of turns. The core is formed of a magnetic material and magnetically couples the windings. The core is configured such that a leakage inductance value of the first winding is greater than a leakage inductance value of the second winding.

In an embodiment, a multi-phase DC-to-DC converter includes an asymmetrical coupled inductor, a first switching circuit, a second switching circuit, and at least one controller for controlling operation of the first and second switching circuits. The coupled inductor includes a first and a second winding, each having a respective first end and a respective second end, and a core formed of a magnetic material. Each first end is electrically coupled to a common first node, and the core magnetically couples together the windings. The core is configured such that a leakage inductance value of the first winding is greater than a leakage inductance value of the second winding. The first switching circuit is electrically coupled to the second end of the first winding and is configured to switch the second end of the first winding between at least two different voltages. The second switching circuit is electrically coupled to the second end of the second winding and is configured to switch the second end of the second winding between at least two different voltages. The controller is configured to shut down the second switching circuit while the first switching circuit remains operational during a light load operating condition.

In an embodiment, a multi-phase DC-to-DC converter includes a coupled inductor, an additional inductor, a first switching circuit, a second switching circuit, and at least one controller for controlling operation of the switching circuits. The coupled inductor includes a first winding having a first end and a second end. The coupled inductor additionally includes a second winding having a first end and a second end, and the first end is electrically coupled to a first node. The coupled inductor further includes a core formed of a magnetic material and magnetically coupling together the windings. The additional inductor includes a first terminal and a second terminal. The first terminal is electrically coupled to the first end of the first winding, and the second terminal is electrically coupled to the first node. The first switching circuit is electrically coupled to the second end of the first winding and is configured to switch the second end between at least two different voltages. The second switching circuit is electrically coupled to the second end of the second winding and is configured to switch the second end between at least two different voltages. The controller is configured to shut down the second switching circuit while the first switching circuit remains operational during a light load operating condition.

In an embodiment, a multi-phase DC-to-DC converter includes a coupled inductor, an additional inductor, a first switching circuit, a second switching circuit, and at least one controller for controlling operation of the switching circuits. The coupled inductor includes a first winding having a first end and a second end, and the first end is electrically coupled to a first node. The coupled inductor additionally includes a second winding having a first end and a second end, and the first end is electrically coupled to the first node. The coupled inductor further includes a core formed of a magnetic material and magnetically coupling together the windings. The additional inductor includes a first terminal and a second terminal, and the first terminal is electrically coupled to the second end of the first winding. The first switching circuit is electrically coupled to the second terminal of the additional inductor and configured to switch the second terminal between at least two different voltages. The second switching circuit is electrically coupled to the second end of the second winding and configured to switch the second end between at least two different voltages. The controller is configured to shut down the second switching circuit while the first switching circuit remains operational during a light load operating condition.

In an embodiment, a multi-phase DC-to-DC converter includes a first inductor, a second inductor, a first switching circuit, a second switching circuit, and at least one controller. The first inductor has a first terminal and a second terminal, and the first terminal is electrically coupled to a first node. The second inductor has a first terminal and a second terminal, and the first terminal is electrically coupled to the first node. The first switching circuit is electrically coupled to the second terminal of the first inductor and is configured to switch the second terminal between at least two different voltages. The second switching circuit is electrically coupled to the second terminal of the second inductor and is configured to switch the second terminal between at least two different voltages. The at least one controller controls operation of the first and second switching circuits and is configured to shut down the second switching circuit while the first switching circuit remains operational during a light load operating condition. The first inductor has an inductance value that is larger than an inductance value of the second inductor, and the first and second switching circuits are each configured to switch at a frequency of at least 20 kilohertz.

In an embodiment, a controller controls operation of a multiphase DC-to-DC converter including at least a first phase and a second phase. The first phase has an effective inductance value that is greater than an effective inductance value of the second phase. The controller is configured to shut down the second phase while the first phase remains operational during a light load operating condition of the DC-to-DC converter.

BRIEF DESCRIPTION OF DRAWINGS

FIG. 23 shows a top plan view of the coupled inductor of FIG. 21. FIGS. 24-26 each show a side perspective view of a winding, according to an embodiment.

FIGS. 24-26 each show a side perspective view of a winding, according to an embodiment.

DETAILED DESCRIPTION OF EMBODIMENTS

Figure 1:
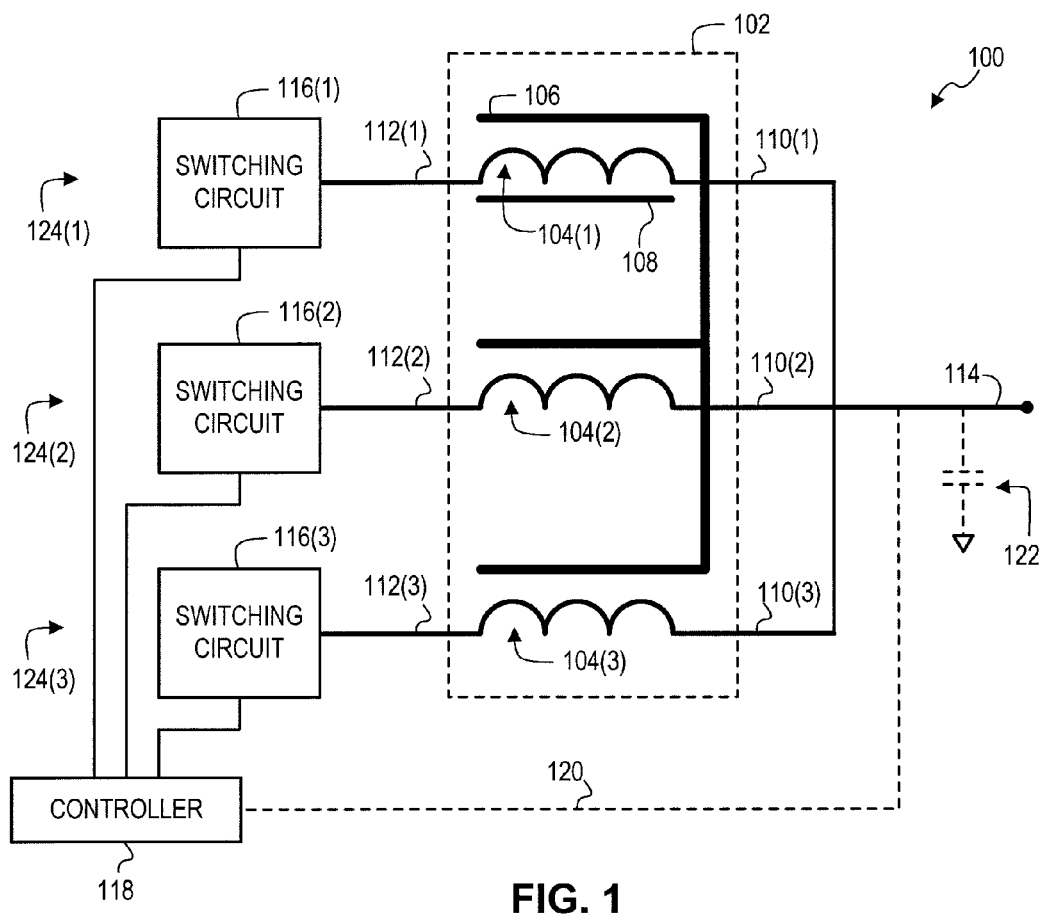
FIG. 1 shows one DC-to-DC converter including an asymmetrical coupled inductor, according to an embodiment.

It is noted that, for purposes of illustrative clarity, certain elements in the drawings may not be drawn to scale. Specific instances of an item may be referred to by use of a numeral in parentheses (e.g., winding 104(1)) while numerals without parentheses refer to any such item (e.g., windings 104).

Light load efficiency of a multiphase DC-to-DC converter including a prior art coupled inductor may be increased by replacing the prior art coupled inductor with an asymmetrical coupled inductor having at least one winding with an elevated leakage inductance value. For example, FIG. 1 shows one multiphase DC-to-DC converter 100 including an asymmetrical coupled inductor 102. Asymmetrical coupled inductor 102 includes a plurality of windings 104 magnetically coupled together by a core 106 formed of a magnetic material. In certain embodiments, each winding 104 has the same number of turns to promote canceling of direct current magnetic flux, thereby helping prevent saturation of core 106. Each winding 104, for example, is a single turn winding to minimize winding resistance and to promote manufacturability of coupled inductor 102. Core 106 is configured such that a respective leakage inductance value of at least one winding 104 is greater than a respective leakage inductance value of at least one other winding 104, which promotes light load efficiency of DC-to-DC converter 100, as discussed below.

In some embodiments, asymmetrical coupled inductor 102 further includes a leakage section 108 formed of a magnetic material and at least partially magnetically isolated from core 106. Leakage section 108 is magnetically coupled to winding 104(1) to increase the leakage inductance value of winding 104(1) such that winding 104(1) has a larger leakage inductance value than winding 104(2) or 104(3).

Each winding 104 has a respective first end 110 and a respective second end 112. Each first end 110 is electrically coupled to a common first node 114. A respective switching circuit 116 is electrically coupled to each second end 112 to switch the second end between at least two different voltages. At least one controller 118 controls switching circuits 116, and controller 118 optionally includes a feedback connection 120, such as to first node 114. First node 114 optionally includes a filter 122.

Each switching circuit 116 and its respective winding 104 electrically coupled thereto forms a phase 124. Accordingly, converter 100 is illustrated in FIG. 1 as including three phases, where a first phase 124(1) includes switching circuit 116(1) and winding 104(1), a second phase 124(2) includes switching circuit 116(2) and winding 104(2), and a third phase 124(3) includes switching circuit 116(3) and winding 104(3). Due to winding 104(1) having a larger leakage inductance value than windings 104(2), 104(3), phase 124(1) has a greater effective inductance than phases 124(2), 124(3). Although DC-to-DC converter 100 is shown as having three phases 124, DC-to-DC converter 100 could have any number of phases greater than one, where coupled inductor 102 has at least one winding for each phase.

DC-to-DC converter 100 typically has a switching frequency, the frequency at which switching circuits 116 switch, of at least about 20 kHz, such that sound resulting from switching is above a frequency range perceivable by humans. Operating DC-to-DC converter 100 at a high switching frequency (e.g., at least 20 kHz) instead of at a lower switching frequency may also offer advantages such as (1) an ability to use smaller energy storage components (e.g., coupled inductor 102 and filter capacitors), (2) smaller ripple current and ripple voltage magnitude, and/or (3) faster converter transient response. To enable efficient operation at high switching frequencies, the one or more magnetic materials forming core 106 and leakage section 108 are typically materials having relatively low core losses at high frequency operation, such as ferrite materials or powdered iron materials.

Controller 118 is configured to shut down at least one phase 124 while remaining phases 124 remain operational during light load operating conditions. Such shutting down of phases may be referred to as "phase shedding". Controller 118 is also optionally configured to operate DC-to-DC converter 100 in discontinuous conduction mode during light load operating conditions. In the example of FIG. 1, controller 118 shuts down all phases 124 except for phase 124(1) during light load conditions. As discussed above, the leakage inductance value of winding 104(1) is greater than those of windings 104(2) and 104(3). Accordingly, during light load conditions where phases 124(2) and 124(3) are shut down, DC-to-DC converter 100 operates with a larger leakage inductance value than during heavier load conditions where additional phases 124 are operating. This larger leakage inductance value decreases the root mean square (RMS) value of current through phase 124(1), thereby reducing AC current related losses and also reducing ripple voltage magnitude. Additionally, the larger leakage inductance value of winding 104(1) decreases magnetic coupling with windings 104(2) and 104(3), thereby helping simplify operation of DC-to-DC converter 100 during operation with reduced phase count, particular in embodiments where controller 118 operates DC-to-DC converter 100 in DCM during light load operating conditions.

In certain embodiments, the leakage inductance value of winding 104(1) is at least about twenty percent greater than those of windings 104(2) and 104(3) to achieve a reduction in ripple current magnitude justifying a cost increase associated with configuring core 106 such that windings 104 have asymmetrical leakage inductance values. In one embodiment, windings 104(2) and 104(3) each have a leakage inductance value ranging from about 25 nanohenries to about 200 nanohenries; such leakage inductance range offers a good compromise between being large enough to prevent excessive ripple current magnitude and small enough to allow for reasonably fast transient response, in typical DC-to-DC converter applications. In such embodiment, winding 104(1) has a leakage inductance value that is greater (e.g., at least twenty percent greater) than those of windings 104(2), 104(3). In certain embodiments, coupled inductor 102 has a magnetizing inductance that is at least about twice the leakage inductance values of windings 104(2), 104(3) to allow for good ripple current cancellation, but is no more than about fifteen times the leakage inductance values of windings 104(2), 104(3) to help prevent saturation of coupled inductor 102.

Although light load efficiency of a DC-to-DC converter utilizing a prior art coupled inductor could be boosted by increasing the prior art coupled inductor's leakage inductance values, such action would degrade the converter's transient response because all windings would necessarily have an increased leakage inductance value. In contrast, use of asymmetrical coupled inductor 102 enables, for example, the leakage inductance value of winding 104(1) to be set relatively high to promote light load efficiency when only a single phase is operating, while the leakage inductance values of remaining windings 104 are set relatively low to promote fast transient response when additional phases are operating.

Leakage section 108 could optionally be configured to saturate under heavy load conditions, such that leakage inductance differences between phases are smaller at heavy loads than at light loads. Such feature may promote equal current sharing among phases under heavy load conditions.

In alternate embodiments, DC-to-DC converter 100 is configured such that asymmetrical coupled inductor 102 includes a plurality of windings 104 with elevated leakage inductance values relative to remaining windings 104. For example, some embodiments include a plurality of leakage sections 108 such that a plurality of windings 104 have elevated leakage inductance values relative to remaining windings 104. In one particular alternate embodiment of DC-to-DC converter 100 (not shown), a respective leakage section 108 is magnetically coupled to each of windings 104(1) and 104(2). Accordingly, in such embodiment, both phases 124(1) and 124(2) have elevated leakage inductance values, and one or both of such phases may operate during light load operating conditions such that DC-to-DC converter 100 operates with larger leakage inductance values at light load conditions than during heavier load conditions.

DC-to-DC converter 100 can be configured to have a variety of configurations. For example, switching circuits 116 may switch second end 112 of their respective winding 104 between an input voltage node (not shown) and ground, such that DC-to-DC converter 100 is configured as a buck converter, first node 114 is an output voltage node, and filter 122 is an output filer. In this example, each switching circuit 116 includes at least one high side switching device and a rectification circuit. The rectification circuit includes one or more diodes and/or one or more switching devices to improve efficiency by reducing voltage drop. In the context of this document, a switching device includes, but is not limited to, a bipolar junction transistor, a field effect transistor (e.g., a N-channel or P-channel metal oxide semiconductor field effect transistor, a junction field effect transistor, a metal semiconductor field effect transistor), an insulated gate bipolar junction transistor, a thyristor, or a silicon controlled rectifier.

As another example, DC-to-DC converter 100 can be configured as a boost converter such that node 114 is an input power node, and switching circuits 116 switch second end 112 of their respective winding 104 between an output voltage node (not shown) and ground. Additionally, DC-to-DC converter 100 can be configured, for example, as a buck-boost converter such that node 114 is a common node, and switching circuits 116 switch second end 112 of their respective winding 104 between an output voltage node (not shown) and an input voltage node (not shown).

Furthermore, as yet another example, DC-to-DC converter 100 may form an isolated topology. For example, each switching circuit 116 may include a transformer, at least one switching device electrically coupled to the transformer's primary winding, and a rectification circuit coupled between the transformer's secondary winding and second end 112 of a respective winding 104. The rectification circuit optionally includes at least one switching device to improve efficiency.

A number of examples of asymmetrical coupled inductor 102 are presented below with respect to FIGS. 2-26. However, it should be understood that asymmetrical coupled inductor 102 is not limited to such examples, and modifications to the examples presented below are possible. For example, although the examples below show coupled inductors with four windings, the coupled inductors presented below can have any number of windings greater than one. As another example, although some of the magnetic elements in the examples below are shown as having shapes that are at least substantially rectangular, the shapes of the magnetic elements may be varied (e.g., rounded).

Figure 2:
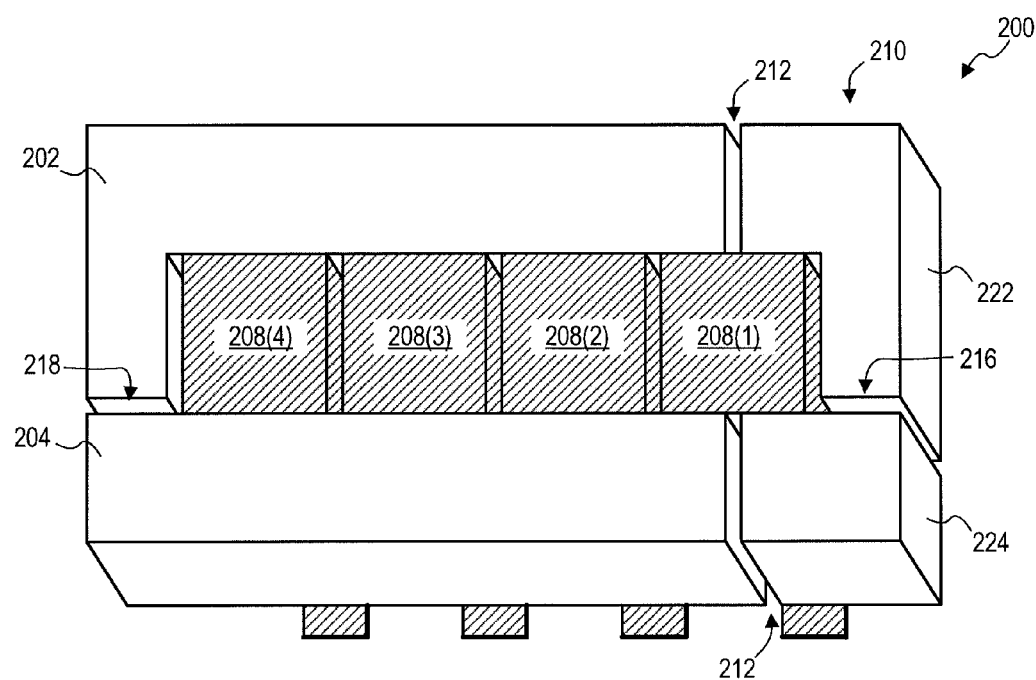
FIG. 2 shows a top perspective view of one asymmetrical coupled inductor, according to an embodiment.
Figure 3:
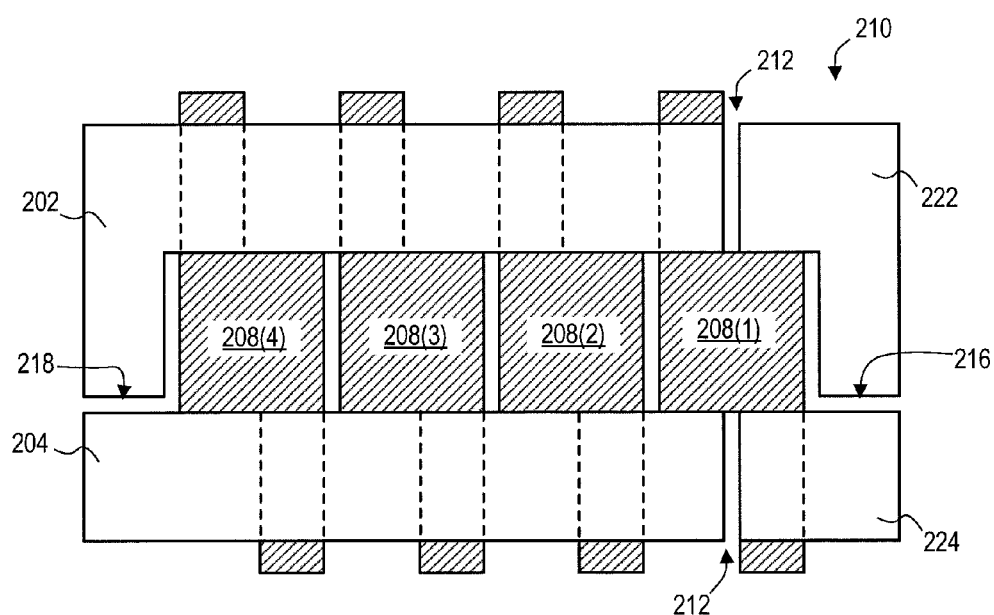
FIG. 3 shows top plan view of the coupled inductor of FIG. 2.
Figure 4:
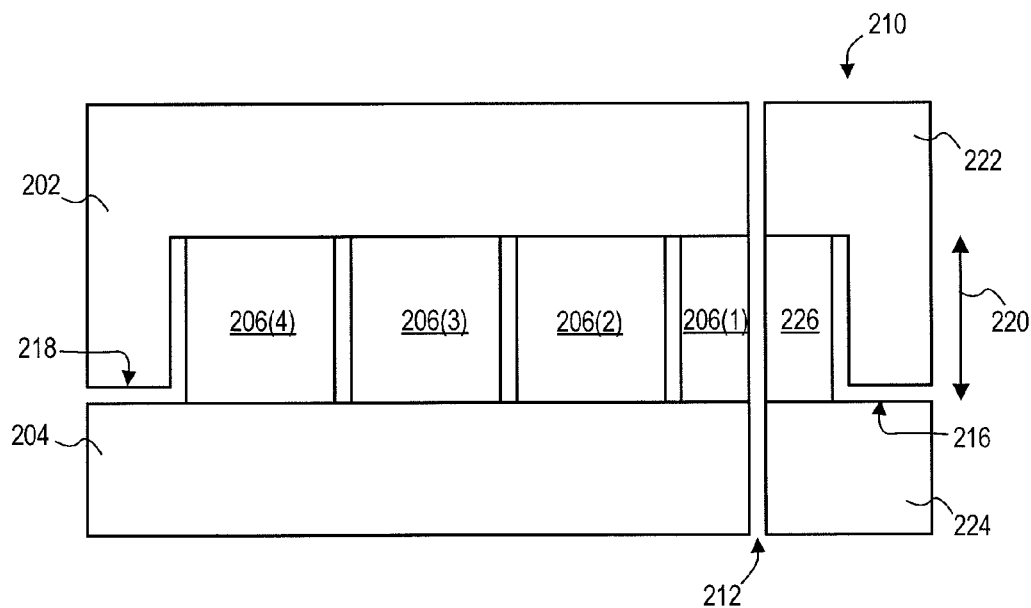
FIG. 4 shows a top plan view of the coupled inductor of FIG. 2 without windings.

FIG. 2 shows a top perspective view and FIG. 3 shows a top plan view of one asymmetrical coupled inductor 200. Coupled inductor 200 includes a core including a first end magnetic element 202, a second end magnetic element 204, and a plurality of connecting magnetic elements 206 disposed between and connecting first and second end magnetic elements 202, 204. A respective winding 208 is wound at least partially around each connecting magnetic element 206. The outlines of windings 208 are shown by dashed lines in FIG. 3 where obscured by magnetic elements. Windings 208 obscure connecting magnetic elements 206 in the views of FIGS. 2 and 3; however, FIG. 4 shows a top plan view of coupled inductor 200 with windings 208 removed to show connecting magnetic elements 206.

Coupled inductor 200 further includes a leakage section 210 magnetically isolated from first and second magnetic elements 202, 204 by a space 212 filled with one or more non-magnetic materials (e.g., air, paper, glue, and/or plastic). Leakage section 210 optionally forms a gap 216. Leakage section 210 is partially obscured by winding 208(1) in FIGS. 2 and 3; however, the entire outline of leakage section 210 is visible in FIG. 4, drawn with windings 208 (FIG. 3) removed. Although leakage section 210 is shown as formed of three magnetic elements 222, 224, and 226, leakage section 210 could be formed of a different number of magnetic elements (e.g., one or two magnetic elements).

Winding 208(1) is at least partially wound around connecting magnetic element 206(1) as well as leakage section 210. Accordingly, winding 208(1) is magnetically coupled to leakage section 210 as well as to the remaining windings 208 of inductor 200. Leakage section 210 increases the leakage inductance value of winding 208(1) relative to the remaining windings 208 of coupled inductor 200. Winding 208(1)'s leakage inductance value may be determined by design of the configuration (e.g., thickness and/or cross-sectional area) of gap 216 of leakage section 210. The inductance values of remaining windings 208 are primarily determined by the configuration (e.g., thickness and/or cross-sectional area) of a gap 218 between first and second end magnetic elements 202, 204. However, the leakage inductance value of winding 208(1) is also affected by the configuration of gap 218.

Connecting magnetic element 206(1) has a cross-sectional area perpendicular to its direction of elongation 220 (see FIG. 4) that is smaller than corresponding cross-sectional areas of remaining connecting magnetic elements 206. This feature of connecting magnetic element 206(1) prevents winding 208(1) from having to be larger than remaining windings 208 to accommodate leakage section 210, and thereby helps minimize the footprint of inductor 200 and reduce length and impedance of winding 208(1).

Figure 5:
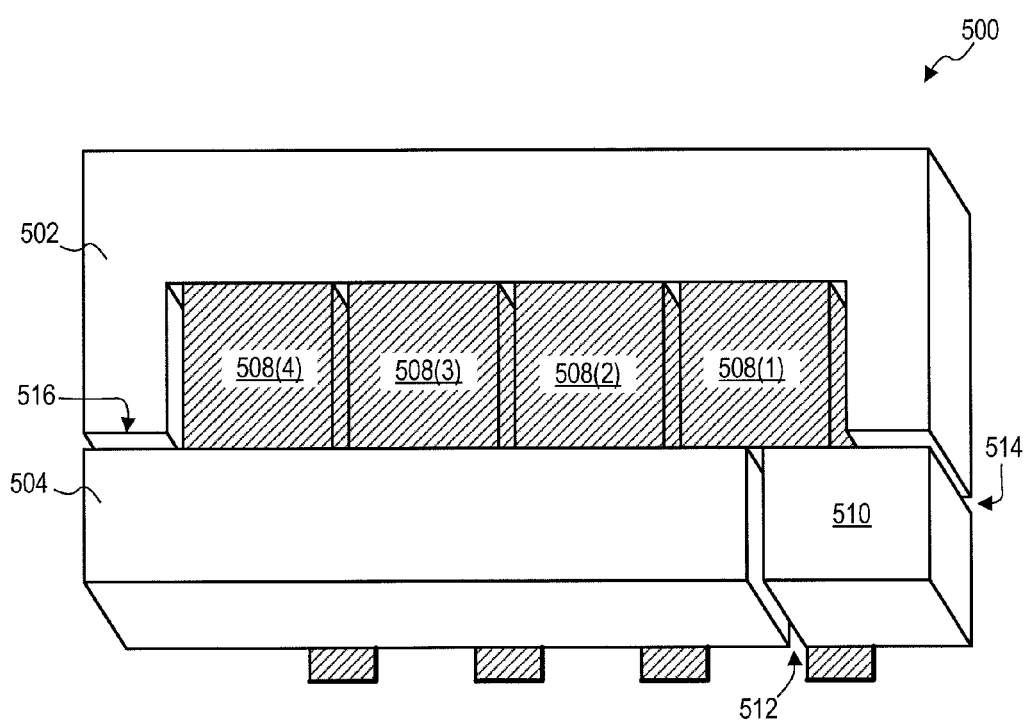
FIG. 5 shows a top perspective view of another asymmetrical coupled inductor, according to an embodiment.
Figure 6:
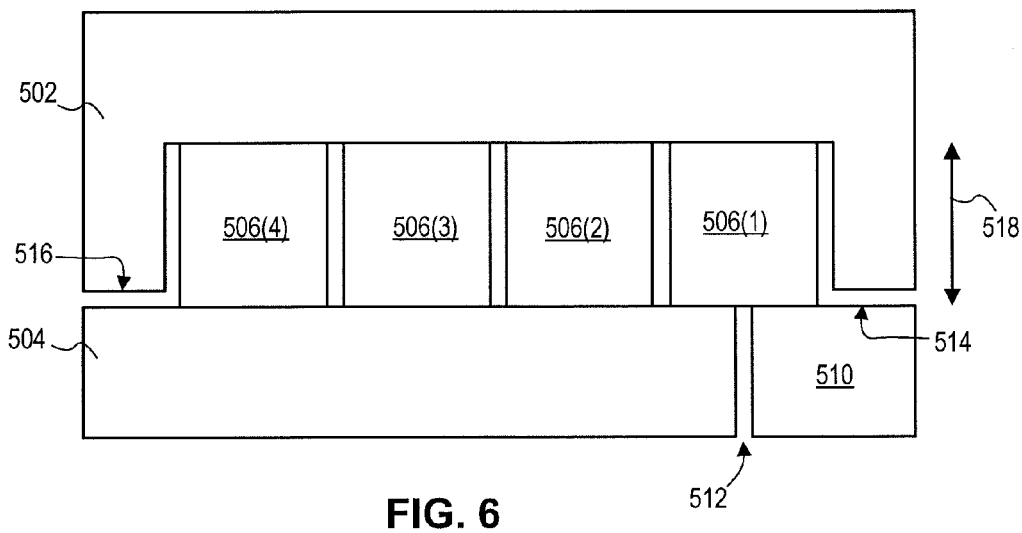
FIG. 6 shows a top plan view of the coupled inductor of FIG. 5 with windings removed.

FIG. 5 shows a top perspective view of one asymmetrical coupled inductor 500, which is similar to coupled inductor 200 of FIGS. 2-4. Coupled inductor 500 includes a core including a first end magnetic element 502, a second end magnetic element 504, and a number of connecting magnetic elements 506 disposed between and connecting first and second end magnetic elements 502, 504. A respective winding 508 is at least partially wound around each connecting magnetic element 506. FIG. 6 shows a top plan view of coupled inductor 500 with windings 508 removed to show connecting magnetic elements 506.

Coupled inductor 500 further includes a leakage section 510, to which winding 508(1) is magnetically coupled. Accordingly, winding 508(1) has a larger leakage inductance value than the remaining windings 508, and the leakage inductance value of winding 508(1) may be determined by design of the configuration (e.g., thickness and/or cross-sectional area) of an optional gap 514, which is filled with one or more non-magnetic material (e.g., air, paper, glue, and/or plastic). The inductance values of remaining windings 508 are primarily determined by the configuration (e.g., thickness and/or cross-sectional area) of a gap 516 between first and second end magnetic elements 502, 504. However, the leakage inductance value of winding 508(1) is also affected by the configuration of gap 516.

In contrast to coupled inductor 200 (FIGS. 2-4), leakage section 510 of coupled inductor 500 is only partially magnetically isolated from the main magnetic core by a space 512. Accordingly, coupled inductor 500 may be easier to construct and have a lower cost than coupled inductor 200. However, the fact that leakage section 510 is only partially isolated from the main core increases the dependence of winding 508(1)'s leakage inductance value on those of remaining windings 508. In contrast to coupled inductor 200, the cross-sectional area of connecting magnetic element 506(1) in perpendicular to its direction of elongation 518 (see FIG. 6) may be the same size or even larger than corresponding cross-sectional areas of remaining connecting magnetic elements 506, thereby helping to reduce core losses and simplify manufacturing.

Figure 7:
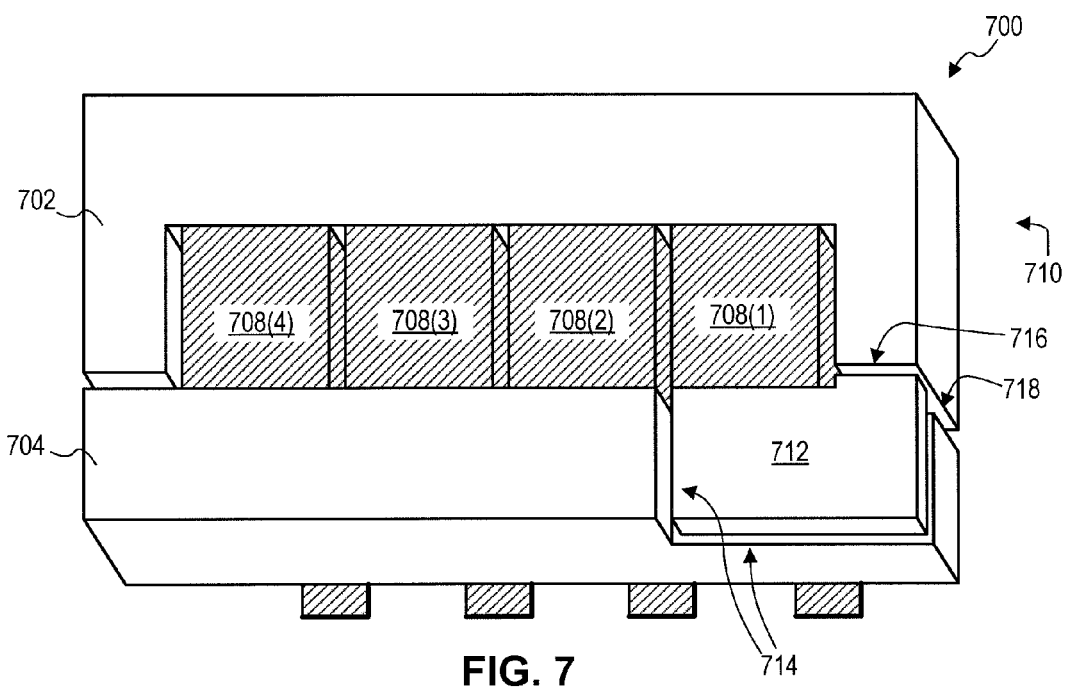
FIG. 7 shows a top perspective view of another asymmetrical coupled inductor, according to an embodiment.
Figure 8:
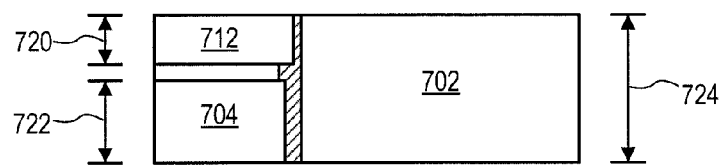
FIG. 8 shows a side plan view of the coupled inductor of FIG. 7.
Figure 9:
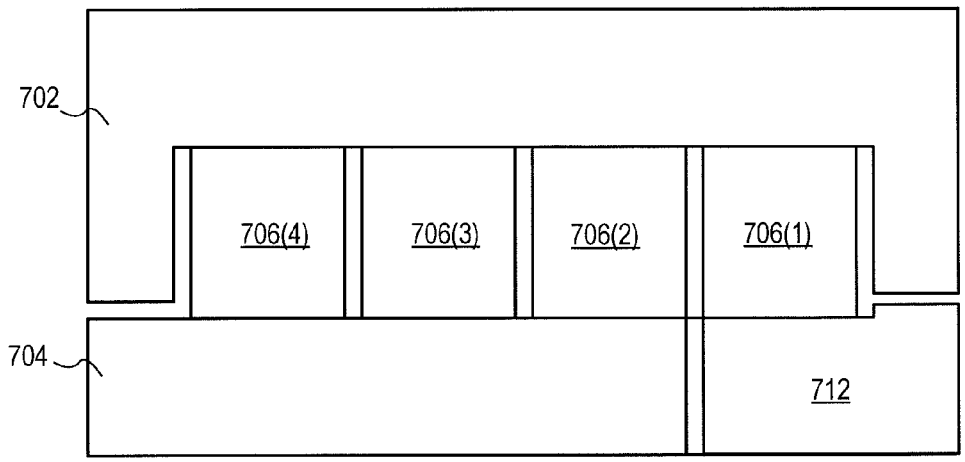
FIG. 9 shows a top plan view of the coupled inductor of FIG. 7 with windings removed.

FIG. 7 shows a top perspective view of one asymmetrical coupled inductor 700, which is similar to coupled inductor 500 of FIGS. 5-6. Coupled inductor 700 includes a core including a first end magnetic element 702, a second end magnetic element 704, a number of connecting magnetic elements 706, and a respective winding 708 wound at least partially around each connecting magnetic element 706. FIG. 8 shows a plan view of side 710 of coupled inductor 700, and FIG. 9 shows a top plan view of coupled inductor 700 with windings 708 removed to show connecting magnetic elements 706.

Coupled inductor 700 further includes a leakage section 712 disposed in a cutout of second end magnetic element 704 and magnetically isolated from second end magnetic element 704 by spaces 714. Spaces 714 are filled with one or more non-magnetic materials, such as air, paper, glue, and/or plastic. Winding 708(1) is magnetically coupled to leakage section 712 as well as to first and second end magnetic elements 702, 704—accordingly, winding 708(1) has a larger leakage inductance value than remaining windings 708. The leakage inductance value of winding 708(1) may be determined by design of the configuration (e.g., thickness and/or cross-sectional area) of a gap 716 between leakage section 712 and first end magnetic element 702. As shown in FIGS. 7 and 8, the thickness of gap 716 need not be the same as the thickness of a gap 718 between second end magnetic element 704 and first end magnetic element 702. In some embodiments, a height 720 of leakage section 712 is about one third of a height 724 of coupled inductor 700, and a height 722 of second end magnetic element 704 under leakage section 712 is about two thirds of height 724 (see FIG. 8).

Coupled inductor 700 may be easier to manufacture than coupled inductor 200 of FIGS. 2-4. However, leakage section 712 is only partially magnetically isolated from the main core of coupled inductor 700, which increases the dependence of winding 708(1)'s leakage inductance value on those of remaining windings 708.

Figure 10:
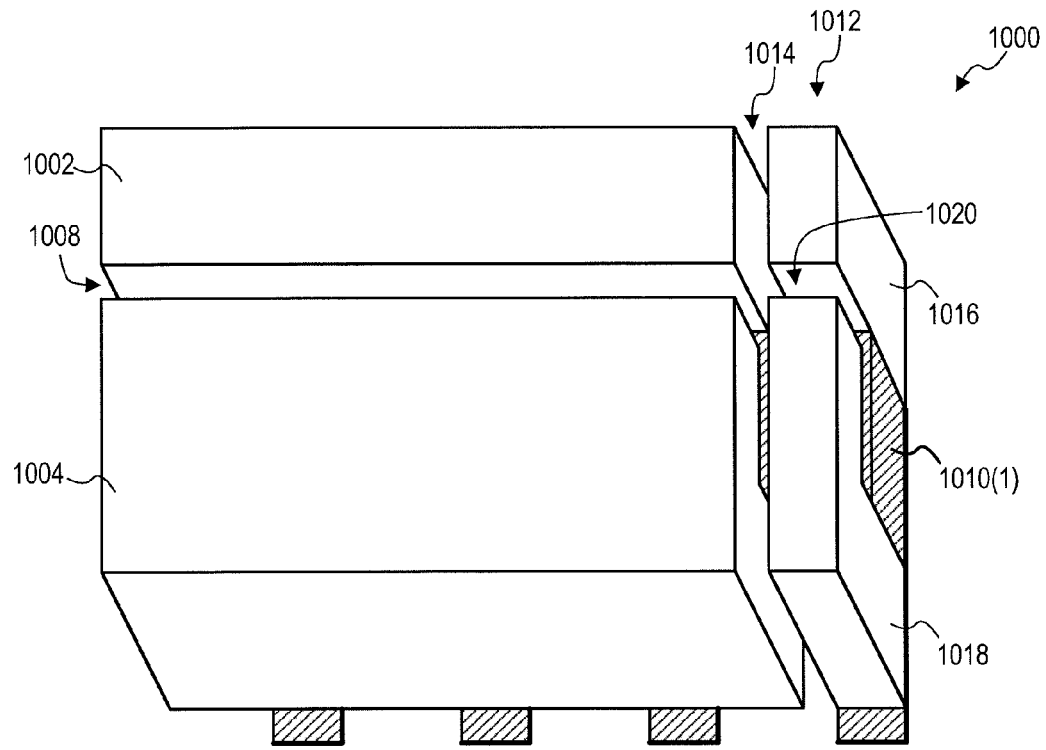
FIG. 10 shows a top perspective view of another asymmetrical coupled inductor, according to an embodiment.
Figure 11:
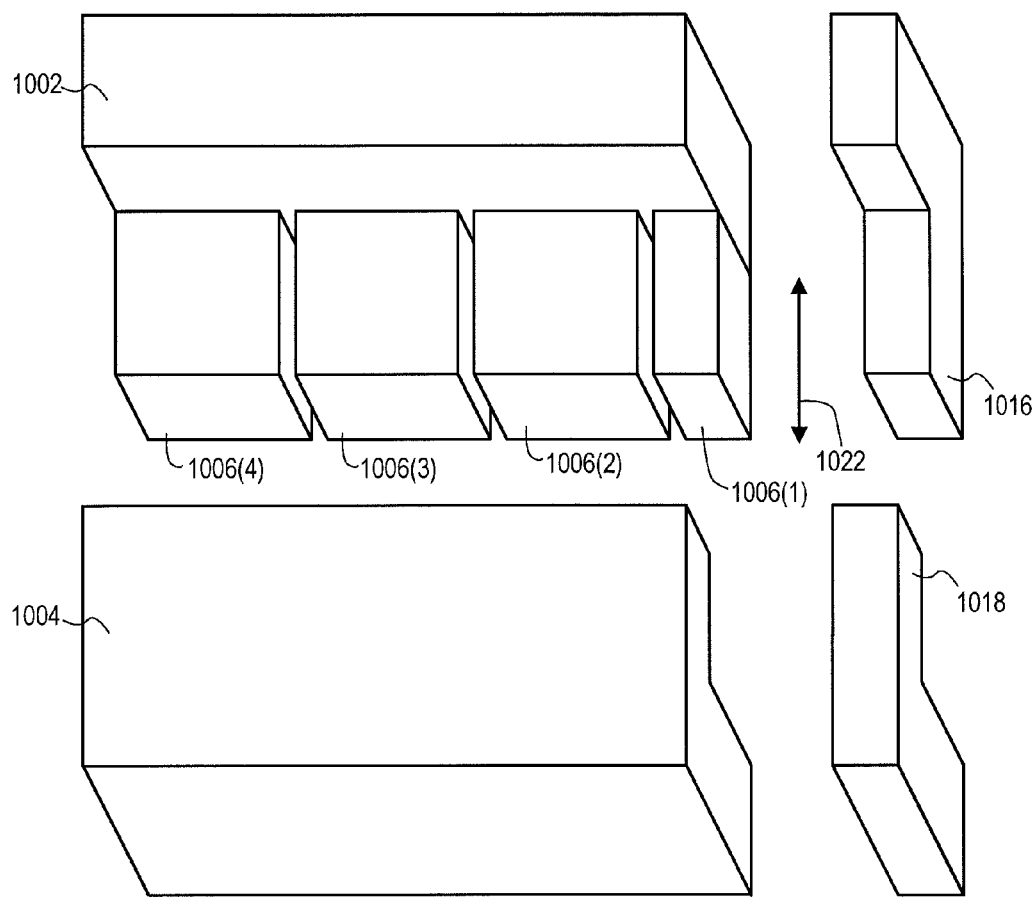
FIG. 11 shows an exploded top perspective view of the coupled inductor of FIG. 10 with windings removed.
Figure 12:
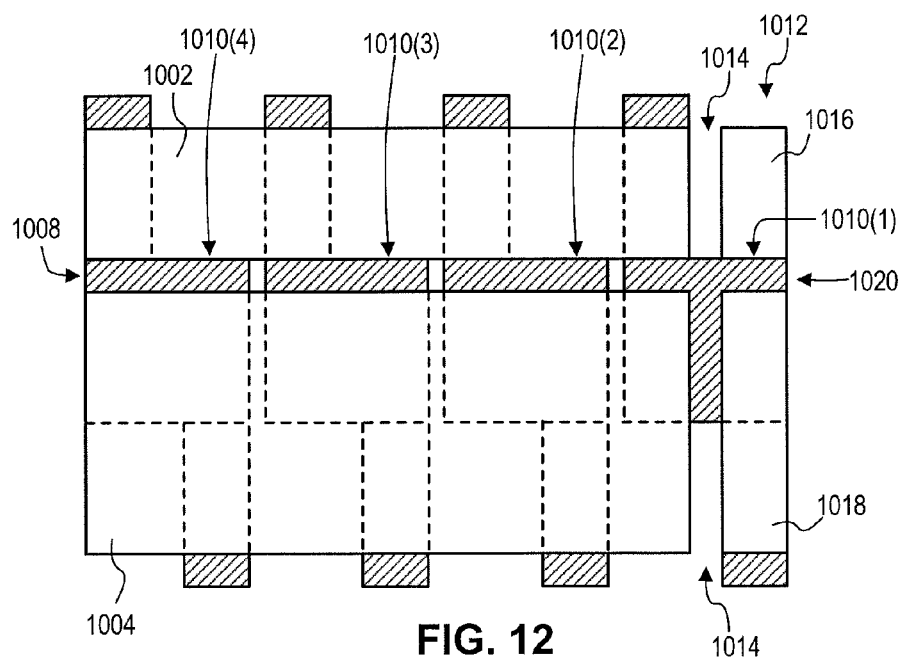
FIG. 12 shows a top plan view of the coupled inductor of FIG. 10.

FIG. 10 shows a top perspective view of one asymmetrical coupled inductor 1000, which includes a core including a first end magnetic element 1002, a second end magnetic element 1004, and a number of connecting magnetic elements 1006 disposed between and connecting first and second end magnetic elements 1002, 1004. A gap 1008 separates end magnetic elements 1002, 1004. Connecting magnetic elements 1006 are not visible in FIG. 10; however, FIG. 11 shows an exploded top perspective view of coupled inductor 1000 where connecting magnetic elements 1006 are visible. A respective winding 1010 is at least partially wound around each connecting magnetic element 1006. Windings 1010 are best seen in FIG. 12, which is a top plan view of coupled inductor 1000. The outlines of windings 1010 are shown by dashed lines where obscured by magnetic elements in FIG. 12. Windings 1010 are omitted from FIG. 11, however, in order to more clearly show the magnetic elements.

Coupled inductor 1000 further includes a leakage section 1012 magnetically isolated from first and second magnetic elements 1002, 1004 by a space 1014 filled with one or more non-magnetic materials (e.g., air, paper, glue, and/or plastic). Although leakage section 1012 is shown as being formed of two magnetic elements 1016 and 1018, leakage section 1012 could alternately be formed of a single magnetic element or more than three magnetic elements. Winding 1010(1) is at least partially wound around and magnetically coupled to leakage section 1012. Accordingly, the leakage inductance value of winding 1010(1) may be determined by design of the configuration (e.g., thickness and/or cross-sectional area) of a gap 1020 formed by leakage section 1012 (e.g., a gap between magnetic elements 1016 and 1018). The leakage inductance values of remaining windings 1010 are primarily determined by the configuration (e.g., thickness and/or cross-sectional area) of gap 1008 between end magnetic elements 1002, 1004. However, the leakage inductance of winding 1010(1) is also affected by the configuration of gap 1008.

As can be seen in FIG. 11, the cross-sectional area of connecting magnetic element 1006(1) perpendicular to its direction of elongation 1022 (see FIG. 11) is smaller than corresponding cross-sectional areas of remaining connecting magnetic elements 1006 to allow winding 1010(1) to be the same size as remaining windings 1010. Such feature helps minimize the footprint of inductor 1000, decrease length and impedance of winding 1006(1), and/or may promote layout compatibility with coupled inductors that do not include a leakage section.

Figure 13:
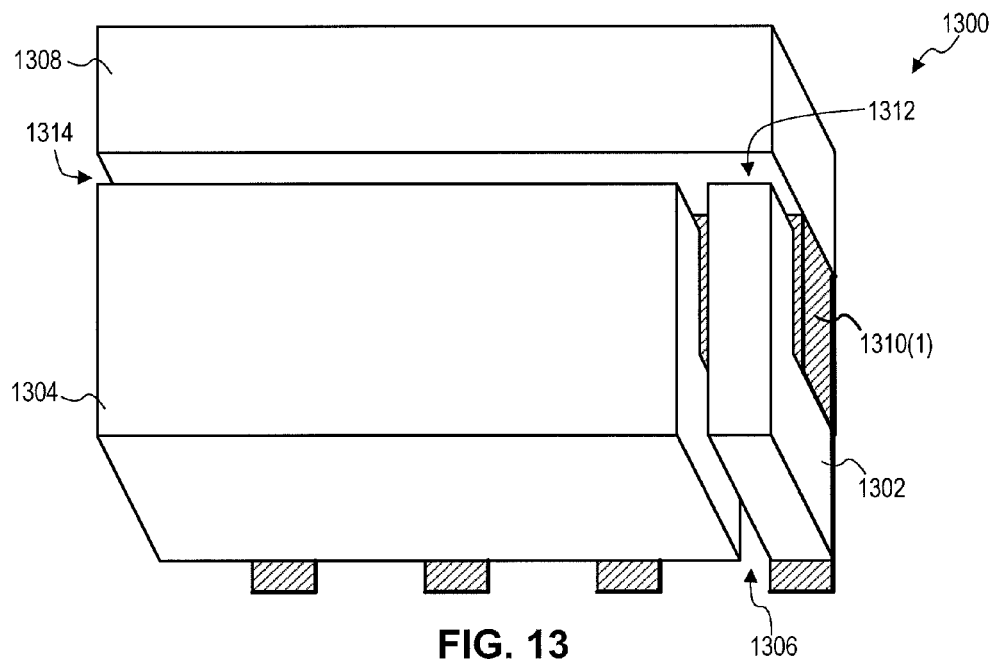
FIG. 13 shows a top perspective view of another asymmetrical coupled inductor, according to an embodiment.
Figure 14:
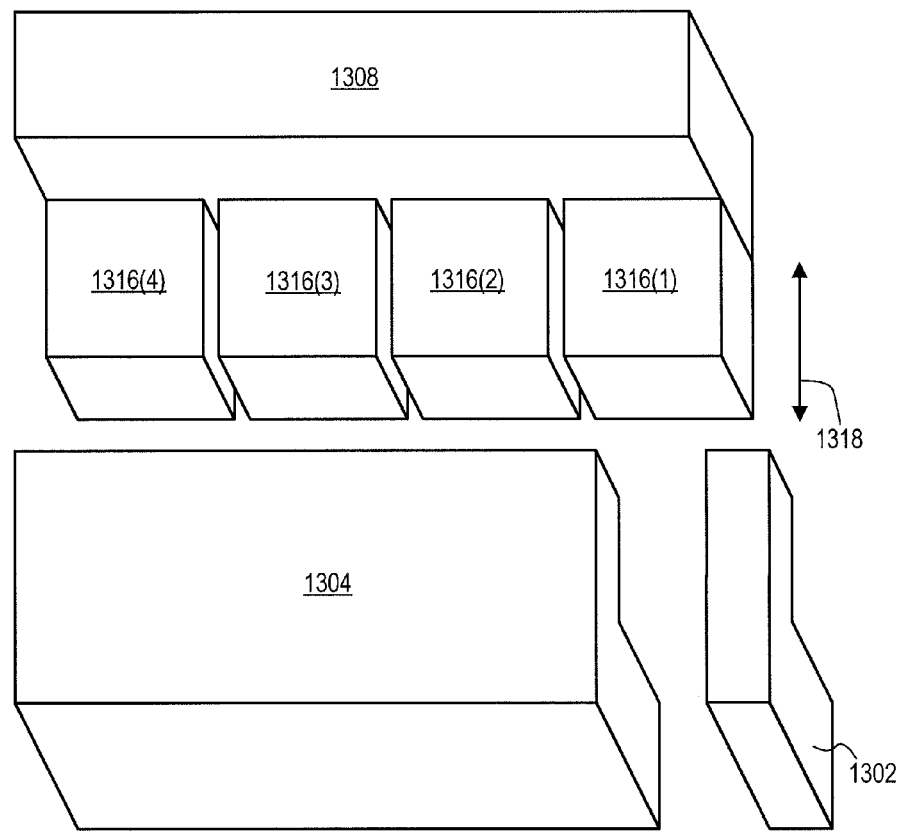
FIG. 14 shows an exploded top perspective view of the coupled inductor of FIG. 13 with windings removed.
Figure 15:
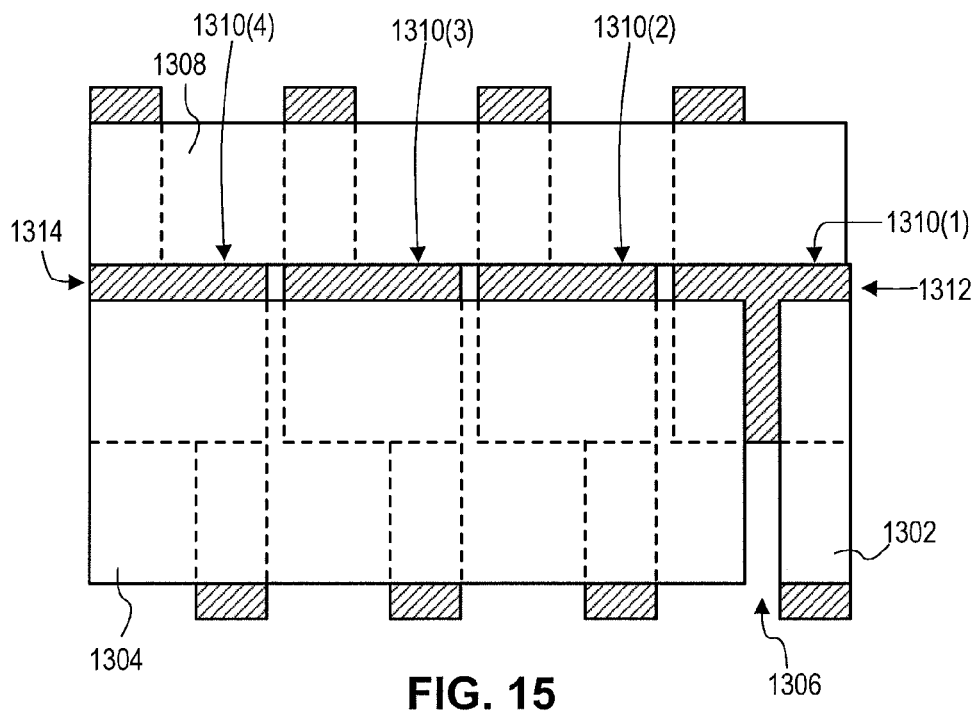
FIG. 15 shows a top plan view of the coupled inductor of FIG. 13.

FIG. 13 shows a top perspective view of one asymmetrical coupled inductor 1300. Coupled inductor 1300 is similar to coupled inductor 1000 of FIGS. 10-12; however, coupled inductor 1300 included a leakage section 1302 which, although magnetically isolated from a second end magnetic element 1304 by a space 1306 filled with one or more non-magnetic materials (e.g., air, paper, glue, and/or plastic), is nevertheless partially magnetically coupled to the main magnetic core. FIG. 14 shows a exploded top perspective view of coupled inductor 1300 with windings removed, and FIG. 15 shows a top plan view of coupled inductor 1300 where winding outlines are shown by dashed lines where obscured by magnetic elements.

A winding 1310(1) is magnetically coupled to leakage section 1302. Accordingly, a leakage inductance value of a winding 1310(1) may be determined by design of the configuration (e.g., thickness and/or cross-sectional area) of a gap 1312 between leakage section 1302 and a first end magnetic element 1308. The leakage inductance values of remaining windings 1310 (see FIG. 15) are primarily determined by the configuration (e.g., thickness and/or cross-sectional area) of a gap 1314 between first and second end magnetic elements 1308, 1304. However, the leakage inductance value of winding 1310(1) is also affected by the configuration of gap 1314.

In contrast to coupled inductor 1000, the cross-sectional area of connecting magnetic element 1316(1) perpendicular to its direction of elongation 1318 (see FIG. 14) may be the same size or even larger than corresponding cross-sectional areas of remaining connecting magnetic elements 1316, thereby helping reduce core losses. Coupled inductor 1300 may be easier to manufacture and/or have a lower cost than coupled inductor 1000. However, the fact that leakage section 1302 is only partially magnetically isolated from the main core increases the dependence of winding 1310(1)'s leakage inductance value on those of remaining windings 1310.

Figure 16:
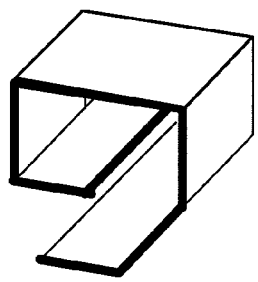
FIGS. 16-20 each show a side perspective view of a winding, according to an embodiment.
Figure 17:
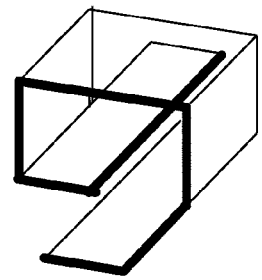
Figure 18:
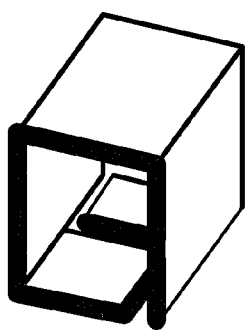
Figure 19:
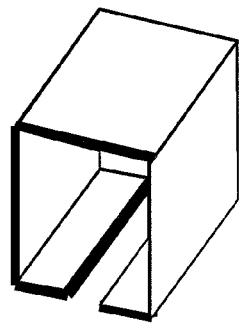
Figure 20:
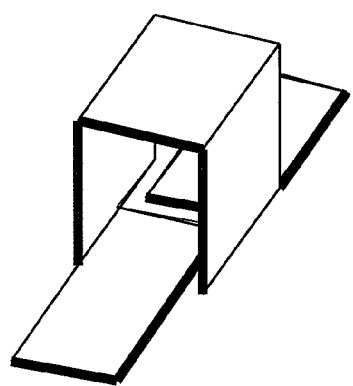

The windings of the coupled inductors discussed above are, for example, single turn, single layer windings having at least substantially rectangular cross section to help minimize winding impedance. FIG. 16 shows a side perspective view, and FIG. 17 shows a partially transparent view, of one winding that may be used in the coupled inductor discussed above. The windings, however, can have other configurations, such as one or more of those shown in FIGS. 18-20.

Figure 21:
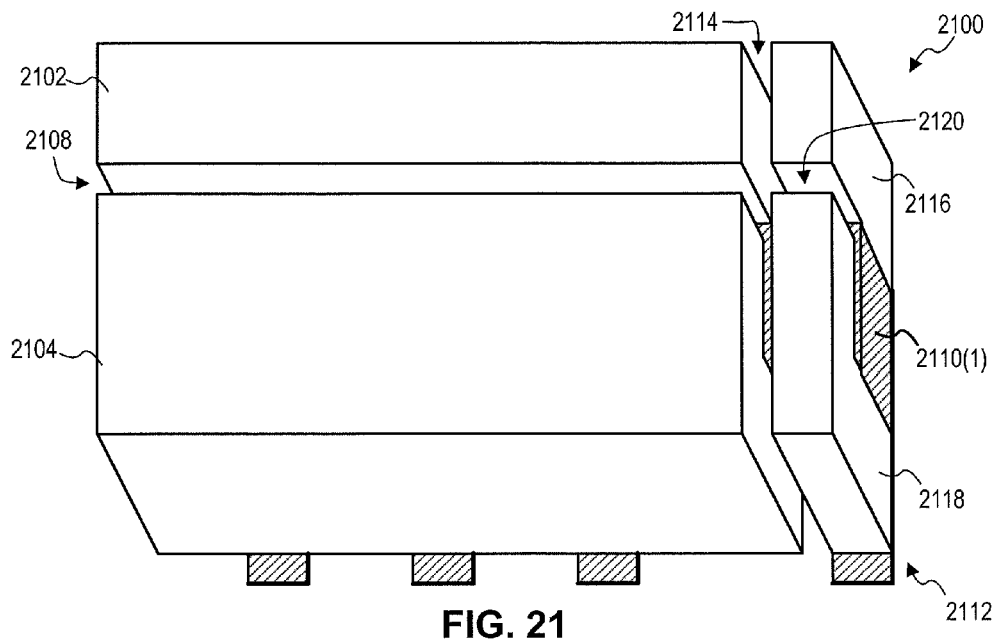
FIG. 21 shows a top perspective view of another asymmetrical coupled inductor, according to an embodiment.
Figure 22:
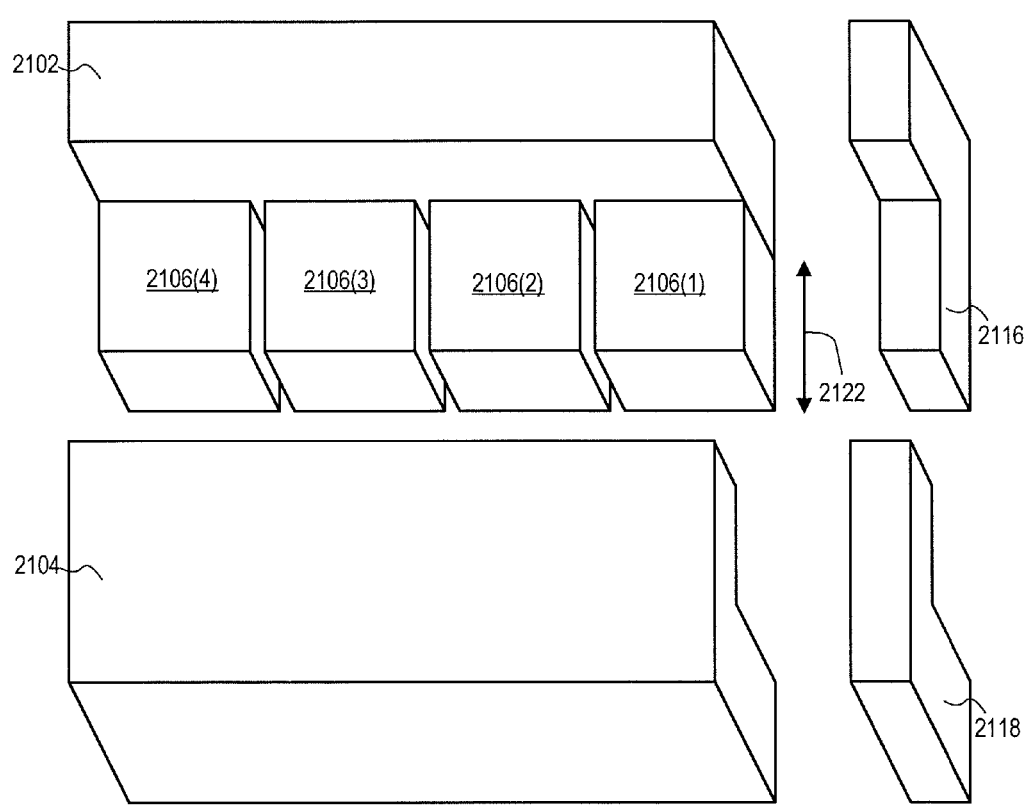
FIG. 22 shows an exploded top perspective view of the coupled inductor of FIG. 21 with windings removed.

FIG. 21 shows a top perspective view of one asymmetrical coupled inductor 2100. Coupled inductor 2100 is similar to coupled inductor 1000 of FIGS. 10-12, however, in contrast to coupled inductor 1000, one connecting magnetic element of coupled inductor 2100 need not have a cross-sectional area perpendicular to its direction of elongation that is smaller than corresponding cross-sectional areas of the remaining connecting magnetic elements. Such feature may promote low core loss at the expense of larger inductor footprint.

Coupled inductor 2100 includes a core including a first end magnetic element 2102, a second end magnetic element 2104, and a number of connecting magnetic elements 2106 disposed between and connecting first and second end magnetic elements, 2102, 2104. Although connecting magnetic elements 2106 are not visible in FIG. 21, they are visible in FIG. 22, which is an exploded top perspective view of coupled inductor 2100 with windings removed. A respective winding 2110 is at least partially wound around each connecting element 2106. Windings 2110 are best observed in FIG. 23, which is a top plan view of coupled inductor 2100 where the outlines of windings 2110 are shown by dashed lines where obscured by magnetic elements.

Coupled inductor 2100 further includes a leakage section 2112 magnetically isolated from first and second end magnetic elements 2102, 2104 by a space 2114 filled with one or more non-magnetic materials (e.g., air, paper, glue, and/or plastic). Although leakage section 2112 is shown as being formed of two magnetic elements 2116 and 2118, leakage section 2112 could alternately be formed of a single magnetic element or more than two magnetic elements. Winding 2110(1) is at least partially wound around and magnetically coupled to leakage section 2112. Accordingly, the leakage inductance value of winding 2110(1) is greater than those of remaining windings 2110, and the leakage inductance value of winding 2110(1) may be determined by design of the configuration (e.g., thickness and/or cross-sectional area) of a gap 2120 formed by leakage section 2112 (e.g., a gap between magnetic elements 2116 and 2118). The leakage inductance values of remaining windings 2110 are primarily determined by the configuration (e.g., thickness and/or cross-sectional area) of a gap 2108 between end magnetic elements 2102, 2104. However, the leakage inductance of winding 2110(1) is also affected by the configuration of gap 2108.

In contrast to coupled inductor 1000, the cross-sectional area of connecting magnetic element 2106(1) perpendicular to its direction of elongation 2122 (see FIG. 22) may be the same size or even larger than corresponding cross-sectional areas of remaining connecting magnetic elements 2106, thereby helping reduce core losses. However, winding 2110(1) must be larger than the remaining windings 2110 to accommodate both connecting magnetic element 2106(1) and leakage section 2112. Winding 2110(1) is, for example, a single turn, single layer winding having at least substantially rectangular cross section to help minimize winding impedance. For example, FIGS. 24-26 show side perspective views of possible configurations of winding 2110(1). The remaining windings 2110, for example, have a configuration similar to that of one of the windings of FIGS. 16-20.

Light load efficiency of a DC-to-DC converter including a prior art coupled inductor can alternately be increased by adding an additional inductor in series with one or more of the coupled inductor's windings, instead of replacing the prior art coupled inductor with an asymmetrical coupled inductor. In such manner, the effective inductance value of selected phases can be increased without having to increase the effective inductance values of all phases, thereby allowing, for example, converter light load efficiency to be increased without significantly degrading transient response.

Figure 27:
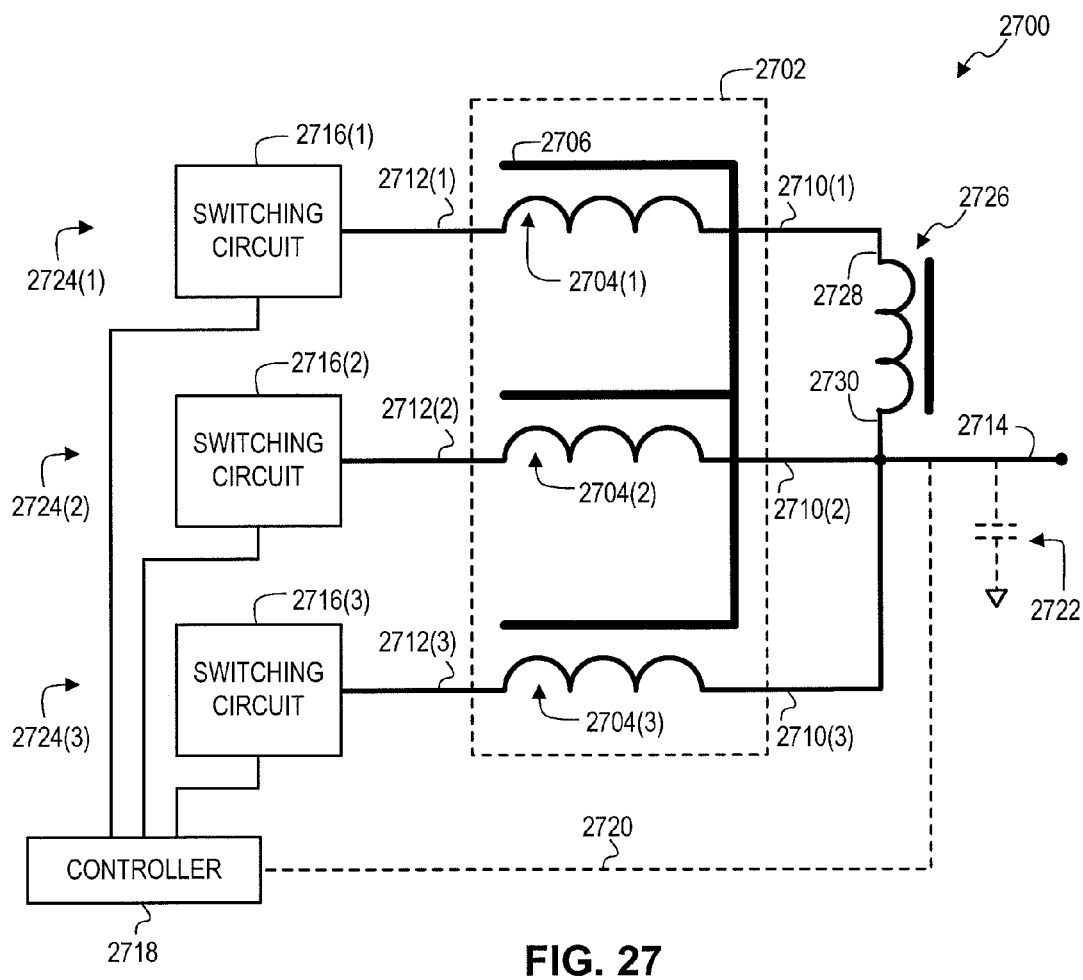
FIG. 27 shows one DC-to-DC converter including an asymmetrical coupled inductor and an additional inductor, according to an embodiment.

For example, FIG. 27 shows one multiphase DC-to-DC converter 2700, which is similar to DC-to-DC converter 100 of FIG. 1. However, DC-to-DC converter 2700 of FIG. 27 does not include an asymmetrical coupled inductor. Instead, DC-to-DC converter 2700 includes a symmetrical coupled inductor 2702 and an additional inductor 2726. Coupled inductor 2700 includes a number of windings 2704 magnetically coupled together by a core 2706 formed of a magnetic material. Each winding 2704 has a respective first end 2710 and a respective second end 2712. First end 2710(1) is electrically coupled to a first terminal 2728 of additional inductor 2726, and a second terminal 2730 of additional inductor 2726 is electrically coupled to a first node 2714. In certain embodiments, each winding 2704 has a leakage inductance value ranging from about 25 nanohenries to about 200 nanohenries to achieve a good balance between sufficiently small ripple current magnitude and sufficiently fast transient response. In such embodiments, additional inductor 2726 has an inductance value that is at least about twenty percent of the leakage inductance value of each winding 2704 to achieve an increase in light load efficiency that is sufficient to justify the cost of additional inductor 2726. In one embodiment, each winding 2704 has a leakage inductance value of about 70 nanohenries, while additional inductor 2726 has an inductance value of about 50 nanohenries. In certain embodiments, coupled inductor 2702 has a magnetizing inductance that is at least about twice the leakage inductance values of windings 2704 to allow for good ripple current cancellation, but is no more than about fifteen times the leakage inductance values of windings 2704 to help prevent saturation of coupled inductor 2702.

The remaining first ends 2710 are electrically coupled to first node 2714. A respective switching circuit 2716 is electrically coupled to each second end 2712 to switch the second end between at least two different voltages. At least one controller 2718 controls switching circuits 2716, and controller 2718 optionally includes a feedback connection 2720, such as to first node 2714. First node 2714 optionally includes a filter 2722. For the reasons discussed above with respect to DC-to-DC converter 100 (FIG. 1), switching converter 2700 typically has a switching frequency of at least about 20 kHz, and the magnetic material forming core 2706 is typically a material having a relatively low core loss at high frequency operation (e.g., at least 20 kHz), such as a ferrite material or a powdered iron material.

Each switching circuit 2716, its respective winding 2704, and its respective additional inductor 2726 (if applicable) forms a phase 2724. Accordingly, converter 2700 is illustrated in FIG. 27 as including three phases, where a first phase 2724(1) includes switching circuit 2716(1), winding 2704(1), and additional inductor 2726, a second phase 2724(2) includes switching circuit 2716(2) and winding 2704(2), and a third phase 2724(3) includes switching circuit 2716(3) and winding 2704(3). Accordingly, phase 2724(1) has a larger effective inductance value than remaining phases 2724 due to inclusion of additional inductor 2726 in phase 2724. It should be noted that although additional inductor 2726 is shown electrically coupled between winding 2704(1) and first node 2714, additional inductor 2726 could alternately be electrically coupled between switching circuit 2716(1) and winding 2704(1) with no change in converter operation. Additionally, although DC-to-DC converter 2700 is shown as having three phases 2724, DC-to-DC converter 2700 could have any number of phases greater than one.

Similar to DC-to-DC converter 100 of FIG. 1, controller 2718 is configured to shut down at least one phase 2724 while remaining phases 2724 remain operational during light load operating conditions, and controller 2718 is also optionally configured to operate DC-to-DC converter 2700 in discontinuous conduction mode during light load operating conditions. In the example of FIG. 27, controller 2718 shuts down all phases 2724 except for phase 2724(1) during light load operating conditions. As discussed above, phase 2724(1) has a larger effective inductance value than remaining phases 2724. Accordingly, during light load conditions where phases 2724(2) and 2724(3) are shut down, DC-to-DC converter 2700 operates with a larger effective inductance value than during heavier load conditions where additional phases 2724 are operating. This larger effective inductance value decreases the RMS value of current through phase 2724(1), thereby reducing AC current related losses and also reducing ripple voltage magnitude.

In alternate embodiments, DC-to-DC converter 2700 is configured such that a respective additional inductor 2726 is electrically coupled in series with two or more windings 2704, thereby increasing the effective inductance value of two or more phases 2724. Such configuration may be used, for example, to boost light load efficiency when two or more phases are to be operated together during light load operating conditions.

Additional inductor 2726 may be a discrete inductor, such as shown in FIG. 27. However, additional inductor 2726 could alternately be part of coupled inductor 2702. For example, additional inductor 2726 could be formed of a bead of magnetic material (e.g., a ferrite bead) disposed on winding 2704(1). As another example, additional inductor 2726 could be physically integrated with coupled inductor 2702. Additional inductor 2726 could optionally be configured to saturate under heavy load conditions to decrease effective inductance of phase 2724(1) and thereby improve converter transient response under heavy load conditions. For example, in one embodiment, additional inductor 2726 has a winding current ranging from $I_1$ to $I_2$ during anticipated normal operation of DC-to-DC converter 2700, where $I_2$ is greater than $I_1$. In such embodiment, additional inductor 2726 has an inductance value at $I_2$ that is no more than about 50% of an inductance value of additional inductor 2726 at $I_1$ to promote fast transient response at heavy loads; thereby justifying the additional cost associated with configuring inductor 2726 to saturate under heavy load conditions.

Similar to DC-to-DC converter 100 of FIG. 1, DC-to-DC converter 2700 can be configured to have a variety of topologies, such as a buck converter where first node 2714 is an output voltage node, a boost converter where first node 2714 is an input voltage node, or a buck-boost converter where first node 2714 is a ground node. Additionally, DC-to-DC converter 2700 may form an isolated topology, such as by including an isolation transformer in each switching circuit 2716.

Figure 28:
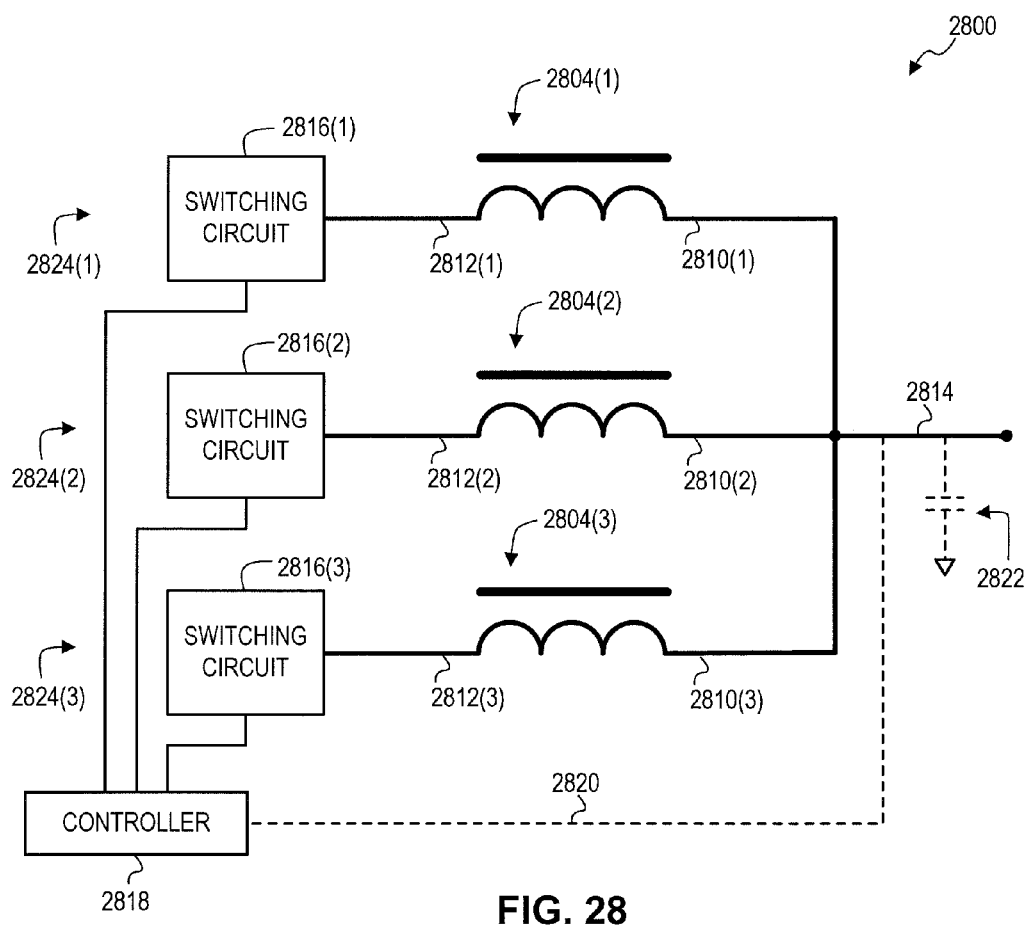
FIG. 28 shows one DC-to-DC converter including discrete inductors, according to an embodiment.

DC-to-DC converter 2700 could be modified to include discrete inductors in place of coupled inductor 2702. For example, FIG. 28 shows one multiphase DC-to-DC converter 2800, which is similar to DC-to-DC converter 2700 of FIG. 27 and includes switching circuits 2816, at least one controller 2818, an optional feedback connection 2820, and an optional filter 2822. However, DC-to-DC converter 2800 includes a discrete inductor 2804 for each phase instead of a coupled inductor. Each inductor 2804 has a respective first terminal 2810 and a respective second terminal 2812. Each first terminal 2810 is connected to a common first node 2814, and each second terminal 2812 is connected to a respective switching circuit 2816. Inductor 2804(1) has an inductance value greater than those of remaining inductors 2804(2), 2804(3) such that phase 2824(1) has an effective inductance value that is greater than those of remaining phases 2824(2), 2824(3). In an alternate embodiment, an inductor 2804 of one or more phases 2824 is replaced with two or more inductors electrically coupled in series. Additionally, although DC-to-DC converter 2800 is shown as having three phases 2824, DC-to-DC converter 2800 could have any number of phases greater than one.

Similar to DC-to-DC converter 2700 of FIG. 27, controller 2818 is configured to control switching circuits 2816 to shut down at least one phase 2824 while remaining phases 2824 remain operational during light load operating conditions, and controller 2818 is also optionally configured to operate DC-to-DC converter 2800 in discontinuous conduction mode during light load operating conditions. In the example of FIG. 28, controller 2818 shuts down all phases 2824 except for phase 2824(1) during light load operating conditions to boost light load efficiency. In an alternate embodiment, two or more phases 2824 include inductors 2804 with inductance values greater than those of remaining phases 2824, and controller 2818 operates such phases with larger inductance values and shuts down phases with smaller inductance values during light load conditions.

Changes may be made in the above methods and systems without departing from the scope hereof. Therefore, the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. An asymmetrical coupled inductor, comprising:
   a first and a second winding;
   a core formed of a magnetic material and magnetically coupling together the windings; and
   a leakage section formed of a magnetic material and at least partially magnetically isolated from the core, the leakage section magnetically coupled to the first winding such that a leakage inductance value of the first winding is greater than a leakage inductance value of the second winding.

2. The coupled inductor of claim 1, further comprising a third winding, the core magnetically coupling together the first, second, and third windings, the leakage inductance value of the first winding being greater than a leakage inductance value of the third winding.

3. The coupled inductor of claim 1, the core comprising a first end magnetic element, a second end magnetic element, and first and second connecting magnetic elements, the first and second connecting magnetic elements disposed between and connecting the first and second end magnetic elements, the first winding being at least partially wound around the first connecting magnetic element, and the second winding being at least partially wound around the second connecting magnetic element.

4. The coupled inductor of claim 3, the first connecting magnetic element having a direction of elongation and a cross sectional area perpendicular to the direction of elongation, the second connecting magnetic element having a direction of elongation and a cross sectional area perpendicular to the direction of elongation, the cross sectional area of the first connecting magnetic element being smaller than the cross sectional area of the second connecting magnetic element.

5. The coupled inductor of claim 3, the first connecting magnetic element having a direction of elongation and a cross sectional area perpendicular to the direction of elongation, the second connecting magnetic element having a direction of elongation and a cross sectional area perpendicular to the direction of elongation, the cross sectional area of the first connecting magnetic element being larger than the cross sectional area of the second connecting magnetic element.

6. The coupled inductor of claim 3, the first connecting magnetic element having a direction of elongation and a cross sectional area perpendicular to the direction of elongation, the second connecting magnetic element having a direction of elongation and a cross sectional area perpendicular to the direction of elongation, the cross sectional area of the first connecting magnetic element having approximately the same size as the cross sectional area of the second connecting magnetic element.

7. The coupled inductor of claim 3, the leakage section comprising a plurality of magnetic elements.

8. The coupled inductor of claim 3, the first winding being wound at least partially around at least a portion of the leakage section.

9. The coupled inductor of claim 1, the magnetic material forming the core being selected from the group consisting of a ferrite material and a powdered iron material.

10. An asymmetrical coupled inductor, comprising:
    a first and second winding;
    a core formed of a magnetic material and magnetically coupling together the windings; and
    a leakage section formed of a magnetic material and at least partially separated from the core by a first non-magnetic material, the first winding wound at least partially wound the leakage section such that a leakage inductance value of the first winding is greater than a leakage inductance value of the second winding.

11. The coupled inductor of claim 10, the leakage inductance value of the first winding being at least twenty percent greater than the leakage inductance value of the second winding.

12. The coupled inductor of claim 10, each of the first and second windings being single turn windings.

13. The coupled inductor of claim 10, at least one of the magnetic material of the core and the magnetic material of the leakage section being selected from the group consisting of a ferrite material and a powdered iron material.

14. An asymmetrical coupled inductor, comprising:
a first and a second winding;
a core formed of a magnetic material, including:
separate first and second end magnetic elements, and
separate first and second connecting magnetic elements, each connecting magnetic element having a first end connected to the first end magnetic element and a second end connected to the second end magnetic element, the first and second windings wound at least partially around the first and second connecting magnetic elements, respectively; and
a leakage section formed of a magnetic material and joined to the first end of the first connecting magnetic element, the leakage section separated from the first end magnetic element by a non-magnetic material.

15. The coupled inductor of claim 14, the first end of the first connecting magnetic element comprising an outer surface joined to both the first end magnetic element and the leakage section.

16. The coupled inductor of claim 15, the outer surface being substantially planar.

17. The coupled inductor of claim 14, the leakage section being disposed in a cutout of the first end magnetic element.

18. The coupled inductor of claim 14, the non-magnetic material comprising at least one of air, paper, glue, and plastic.

19. The coupled inductor of claim 10, the first non-magnetic material comprising at least one of air, paper, glue, and plastic.

20. The coupled inductor of claim 10, the core comprising a first end magnetic element, a second end magnetic element, and first and second connecting magnetic elements, each connecting magnetic element connecting the first and second end magnetic elements, the first winding being at least partially wound around the first connecting magnetic element, and the second winding being at least partially wound around the second connecting magnetic element.

21. The coupled inductor of claim 20, the first winding forming a first turn around both of (a) at least a portion of the first connecting magnetic element, and (b) at least a portion of the leakage section.

22. The coupled inductor of claim 21, the first connecting magnetic element being separated from the leakage section within the first turn by a second non-magnetic material.

23. The coupled inductor of claim 22, the second non-magnetic material comprising at least one of air, paper, glue, and plastic.

24. The coupled inductor of claim 10, the leakage section comprising a plurality of magnetic elements, at least two of the plurality of magnetic elements of the leakage section being separated from each other by a non-magnetic material.

25. An asymmetrical coupled inductor, comprising:
a ladder-style magnetic core including first and second rails and a plurality of rungs, each rung joining the first and second rails;
a respective winding at least partially wound around each rung; and
a leakage section formed of magnetic material and separated from the first rail by a non-magnetic material;
an end surface of a first one of the plurality of rungs coupled to both the first rail and the leakage section.

26. The coupled inductor of claim 25, the end surface being substantially planar.

27. The coupled inductor of claim 25, the leakage section being coupled between the end surface and the second rail.

28. An asymmetrical coupled inductor, comprising:
a ladder-style magnetic core including two rails and first and second rungs, each of the first and second rungs joining the two rails;
a leakage section formed of magnetic material and separated from the ladder-style magnetic core by a non-magnetic material;
a first winding wound at least partially around both of the first rung and the leakage section; and
a second winding wound at least partially around the second rung.

29. The coupled inductor of claim 28, the leakage section forming a loop around the first winding.

30. The coupled inductor of claim 28, first winding forming a first turn around both of (a) at least a portion of the first rung, and (b) at least a portion of the leakage section.

* * * * *